United States Patent [19]

Janzen et al.

[11] Patent Number: 4,948,151
[45] Date of Patent: Aug. 14, 1990

[54] ROTARY END FACE SEAL ASSEMBLY

[75] Inventors: Peter Janzen; Raymond Metcalfe, both of Chalk River, Canada

[73] Assignee: Atomic Energy of Canada Limited, Ontario, Canada

[21] Appl. No.: 917,522

[22] Filed: Oct. 10, 1986

[51] Int. Cl.$^5$ .............................. F16J 15/38
[52] U.S. Cl. .......................... 277/27; 277/70; 277/81 R; 277/93 SD; 277/96.1; 277/96.2; 277/198; 277/215
[58] Field of Search ............... 277/74, 75, 76, 81 R, 277/93 R, 93 SD, 27, 96, 96.1, 3, 198, 215, 2, 70, 96.2

[56] References Cited

U.S. PATENT DOCUMENTS

| | | | |
|---|---|---|---|
| 2,188,784 | 1/1940 | Grothoust | 277/75 |
| 2,948,555 | 8/1960 | Wright | 277/81 X |
| 2,995,390 | 8/1961 | Gardner | 277/96.2 X |
| 3,315,968 | 4/1967 | Hanlon | 277/3 |
| 3,356,378 | 12/1967 | Tracy | 277/198 X |
| 3,433,489 | 3/1969 | Wiest | 277/75 X |
| 3,471,159 | 10/1969 | Baumler | 277/96.1 X |
| 3,486,760 | 12/1969 | Tracy | 277/75 |
| 3,499,653 | 3/1970 | Gardner | 277/96.1 X |
| 3,540,742 | 11/1970 | Tracy | 277/75 X |
| 3,575,424 | 4/1971 | Tashenberg | 277/27 |
| 3,589,738 | 6/1971 | Tracy | 277/74 |
| 3,628,799 | 12/1971 | Wiest | 277/74 X |
| 3,759,532 | 9/1973 | Lindeboom | 277/75 X |
| 3,804,424 | 4/1974 | Gardner | 277/96.1 X |
| 3,813,103 | 5/1974 | Wiest | 277/74 X |
| 3,836,216 | 9/1974 | Junker | 277/27 X |
| 3,905,605 | 9/1975 | Hubner | 277/75 X |
| 4,099,728 | 7/1978 | Wiest | 277/93 SD |
| 4,114,900 | 9/1978 | Wiest | 277/74 X |
| 4,415,168 | 11/1983 | Takenaka et al. | 277/96.1 |
| 4,511,149 | 4/1985 | Wiest | 277/27 X |

FOREIGN PATENT DOCUMENTS

1650061 9/1969 Fed. Rep. of Germany ........ 277/27

Primary Examiner—Allan N. Shoap
Attorney, Agent, or Firm—Cushman, Darby & Cushman

[57] ABSTRACT

An improved rotary end face seal assembly used singly or in combination with other seals, preventing escape of a contained pressurized medium, gas or liquid, through the annulus between a stationary housing and a rotating shaft, comprises a rotary assembly and a stationary assembly. One of either the rotary assembly or stationary assembly is axially movable and usually spring mounted. A rotor and stator component of the respective assemblies have sealing faces in close sliding proximity. One of either the rotor or stator is a composite ring comprising an interlocked pair of annular rings, an outermost of which constrains an innermost ring of dissimilar material. A protruding seal face extends axially from this innermost ring or from the mating seal ring of dissimilar material. Support rings for each of the rotor and stator are precisely matched with the corresponding seal ring to achieve precise control of the seal ring deformation. An isolation ring may act as an adaptor to separate a support ring from any given mounting component.

17 Claims, 3 Drawing Sheets

ROTARY END FACE SEAL ASSEMBLY

BACKGROUND OF THE INVENTION

1. Field of the Invention

The invention relates to rotary end face seals used to contain a pressurized medium by sealing the annulus between a stationary housing and a rotary shaft, for example, as found in pumps in which a drive shaft penetrates the pressure boundary.

2. Brief Description of Prior Art

Rotary end face seals relating to this invention are advantageously employed over the full spectrum of parameters defining present industrial service and operating conditions. One of the more demanding applications of rotary end face seals is in the nuclear industry where, for example, primary pumps circulate reactor coolant at pressures and temperatures ranging above 2000 psig and 550° F. respectively. Seal support systems attempt to maintain a normal operating seal environment temperature below about 150° F., but fluctuating fluid temperatures and short term excursions above 200° F. can be experienced due to support system transients or loss of some support systems; higher environment temperatures can result from loss of all seal support systems. Seal environment pressures also fluctuate in response to reactor operating conditions, and the pumps (and seals) may be stopped or started at various pressures or temperatures.

A typical rotary end face seal assembly includes a rotary assembly and a stationary assembly, with either assembly axially movable and spring mounted. Either the rotary assembly or the stationary assembly has a component with a protruding seal face in close sliding proximity with the seal face of a component of dissimilar material of the mating assembly. Each of the components with the seal faces is supported by a support ring of some kind, sometimes referred to as a back-up ring, carrier ring, holder or other.

Seal performance, in terms of effectiveness and life-span is determined primarily by the condition of the two seal faces and the sealing gap between them. As installed, the seal faces must be finished precisely to within lightbands of the specified flatness, concavity or convexity. Maintenance of the integrity of the sealing gap and seal faces during service is the prime objective of seal design and quality control.

With an increase in pressure, all exposed seal components will deform axially and radially due to direct pressure and due to interaction forces, normal and shear, generated between contacting components as a result of the action of pressure. A change in seal assembly design will alter the magnitude of the interactive forces. The seal ring sealing faces will generally suffer distortion, resulting in change of the sealing gap profile. Too much distortion leads either to excessive leakage or to excessive seal face rubbing contact with resulting damage to the seal faces. Subsequent changes in pressure cannot restore the integrity of damaged seal faces and sealing gap and sealing performance are permanently reduced.

Although the magnitude of the pressure-induced axial forces of component interaction are proportional to pressure magnitude, radial shear forces resulting from friction between components can be non-linear and can change direction on substantial reversal of pressure change. The likelihood of occurrence of sliding between each seal ring and its support or back-up ring is heightened by the great disparity in their values of Young's modulus.

Although homogeneous, unconstrained components experiencing uniform temperature change will deform symmetrically with unaltered stress state, imposed constraints will alter the deformation and stress state. That is, axial and radial forces between contacting components may change with uniform temperature change of all components, with a consequent distortion of the seal face profiles and the sealing gap, again leading to either excessive leakage or to seal face rubbing contact with resulting damage to the seal faces. Non-equal bulk changes in temperature among constrained components will also cause altered states of contacting forces and related stress and deformation states with consequent undesirable sealing performance. Internally non-uniform component temperature changes will cause non-uniform component deformation and, if constrained, an altered component stress state. In operation, the seal assembly would see a complicated combination of the above idealized temperature changes.

Complicating the situation of pressure and thermally induced deformation and change in stress state, and exaggerating the deleterious effects on seal performance is the use of dissimilar materials for contacting components. In particular, differential radial deformation due to pressure and temperature change of relatively statically contacting components of dissimilar materials will generate radial shear forces which can vary non-linearly and change direction with temperature and pressure changes.

Carbon graphite is a typical material of choice for the protruding seal face component because of its low characteristic sliding friction and the resultant low wear rate. Other crucial properties of carbon graphite such as its Young's modulus, strength, thermal expansion coefficient and permeability are highly variable and highly discrepant relative to the materials of choice for the other components of the seal assembly Generally, to resist high operating pressures, the carbon graphite component must be of a relatively large cross-section. For large-size carbon graphite rings the effects of the non-homogeneity of its properties are magnified, contributing to non-uniform and unpredictable response, uneven and excessive wear and seal leakage, and frequently premature and unexpected seal failure with its attendant risk of hazardous consequences, loss of benefits and cost of remedial actions.

In typical seals, the difference in mechanical and material properties between the carbon graphite ring and its support ring, as well as between the mating seal face component and its support ring, results in a non-linear response to operating conditions, particularly to changes of pressure and temperature. As a result of the intimate interaction of each sealing ring and its support or back-up ring, the sealing conditions at the sealing interface suffer, leading to a highly non-linear relationship between pressure change or temperature change and leakage. This undesirable seal characteristic is known as seal face deflection hysteresis.

Many rotary end face seal assemblies also experience unstable performance characterized by erratic and excessive leakage and seal face wear as a result of thermal sensitivity inherent in the design of their components. When such seal assemblies are placed in a tandem (series) arrangement for the purpose of sharing a high pressure drop, the temperature and pressure sensitivities, or the pressure sensitivity alone, can initiate a complex, undesirable, unstable pressure oscillation between succeeding seal cavities, resulting in a further escalation of seal face deterioration and premature seal failure.

Therefore, typical rotary end face seal performance under fluctuating operating conditions is plagued by instability, unreliability and unsatisfactory seal life. This invention addresses these problems of seal performance with novel features yielding a more stable and predictable performance and longer life.

SUMMARY OF THE INVENTION

The present invention employs means to reduce the effect of the variability of the physical and mechanical properties of the carbon graphite of the composite seal ring, particularly on the deflection of the sealing face.

The invention provides means to achieve a more uniform temperature distribution within and among adjacent seal assembly components.

The invention employs means to reduce seal face deflection due to uniform change of temperature of the sub-assembly containing the composite seal ring, and to limit dramatically, compared to existing end face seals, the seal face deflection due to uniform change of temperature of the mating sub-assembly.

A provision in the invention ensures minimal seal face deflection due to axial forces between components generated due to pressure of the contained medium.

Further, the invention employs means to reduce the seal face deflection hysteresis of the sub-assembly containing the composite seal ring due to both pressure and temperature changes.

Moreover, the invention provides for isolation of the entire seal assembly from the stationary housing to alleviate any detrimental effects on seal face deflection due to housing deformation caused by the pressure and temperature of the confined medium.

The invention embodies means whereby monitored leakage can be used as an indicator of seal face wear and impending end of life.

The invention provides means which allow a single seal assembly to perform reliably, stably and durably while subjected to pressures up to 2500 psig and temperatures up to 200° F.

Accordingly, in one aspect, there is provided a rotary end face seal including a pair of sealing members in relatively rotatable sealing engagement, with each of said members defining a generally radially arranged annular sealing surface. Suitable means are provided for holding the annular sealing surfaces in face-to-face sealing proximity with one another to separate a zone of higher fluid pressure from a zone of lower fluid pressure. One of the sealing members is of composite structure and includes an interlocked pair of annular rings with one said ring having the sealing surface thereon and being of a relatively weak and/or deformable material (such as carbon graphite), and the other one of the rings being of a relatively strong material (such as steel or other high strength metal) and embracing or otherwise structurally supporting the first noted ring in shrink-fitted or other interlocked relation thereto. An interface is defined by the region of contact between the innermost and outermost rings. The interface is located such that any ingressing fluid (i.e. fluid seeping into the interface) tends to alter both the pressure differential across the rings and the interlocked relation between said rings The invention provides means associated with the interface to reduce the action of any such ingressing fluid and to allow for the presence of a higher pressure differential between said zones with lower stress or deflection of the weaker and/or more deformable ring and/or reduced tendency to alter the interlocked relation thereof with the strong ring. Preferably, the above-noted means associated with the interface comprises passages leading from the interface into one of the above-noted zones of fluid pressure.

The above-noted rings may be arranged in concentric relation with one another with the stronger ring surrounding the inner, weaker and/or more deformable ring in shrink-fitted or bonded relation thereto thus interlocking the two rings together The interface is defined along an annular region where the rings contact each other. In the case of a pressure drop radially inwards across the seal face the interface is drained to the inside low pressure zone. By virtue of this improvement, the composite seal ring is capable of sealing much higher pressures than were hitherto possible without experiencing troublesome stress, deflection and/or distortion.

A still further aspect of the invention provides for a reduction in thermal gradients between the seal components. This seal, as before, includes an annular stator assembly and an annular rotor assembly each having annular seal faces which are held in relatively rotatable face-to-face sealing proximity to separate zones of high and low fluid pressure from one another, such zones being subject to temperature differentials and/or temperature changes. In accordance with this aspect of the invention, passage means are provided in at least one of the assemblies and they are exposed to differential fluid pressures to induce flow. These differential pressures are created by centrifugal, viscous or momentum forces from rotation of the rotor assembly or from cooling or staging flow which is bled from the seal vicinity. The passage means promote axisymmetric cooling by the action of the flowing fluid which tends to equalize temperatures circumferentially of the seal assemblies and to reduce thermal gradients in the radial and axial directions, thereby to reduce thermal distortion of the seal assemblies.

In a preferred form of the invention, the rotor assembly includes a rotary seal ring having one of the above-noted seal faces thereon with a rotary support ring sealingly engaged with the rotary seal ring and rotatable therewith. The above-noted passage means includes an radial space or gap between the rotary seal ring and the support ring, with the passage means being arranged to create a swirling flow of the fluid in such radial space over adjacent end surfaces of the support and seal rings thereby to assist in providing more equal and axisymmetric temperatures in the support ring and seal ring and thus reducing any thermal distortion of same.

As a further feature of the invention, the above noted passage means includes flow passages associated with the stator assembly, first ends of such flow passages communicating with one of the pressure zones while the other ends of the flow passages communicate with a further zone from which a controlled leakage to a further region occurs. These flow passages are arranged to create swirling flow in said further zone thus tending to reduce temperature gradients in the stator assembly and to make them axisymmetric. Preferably, the stator assembly includes a rigid support ring which supports the stationary seal ring. This assembly is fully exposed to the moving fluids in the further zone whereby their temperatures are stabilized. As noted previously, by substantially reducing thermal gradients throughout the assembly, any tendency for seal face distortion to occur as a result of temperature change is also substantially reduced.

Further features and advantages of the invention will become apparent from the following detailed description and the appended claims.

DETAILED DESCRIPTION OF THE PREFERRED EMBODIMENT GENERAL ARRANGEMENT

With reference now to the drawings there is illustrated a seal assembly 10 located within an envelope defined by a removable extension 12 of a stationary housing 14 and a shaft sleeve 16 which is secured to a rotatable shaft 18 for rotation therewith. The narrow annulus 20 between the shaft and the shaft sleeve is sealed to prevent by-pass of the pressurized fluid medium around the seal. In the particular embodiment shown, the pressurized fluid medium gains access to the chamber 22 defined by the above-described envelope by way of an annular gap 24 defined between the shaft sleeve 16 and the stationary housing 14.

The seal assembly 10 includes two main sub-assemblies, namely, a rotary assembly 26 and a stationary assembly 28. The main components of the rotary assembly 26 are the rotary seal ring 30, a rotary support ring 32 which sealingly engages the rotary seal ring 30 and applies contact force thereto, and a drive ring 34 which ensures rotation of the seal ring 30 along with its support ring 32. A biasing spring assembly 36, secured for rotation along with the shaft sleeve 16, applies a suitable biasing force to the rotary support ring 32 and is constrained for rotation therewith in a manner to be described in detail hereafter.

Figure 1:
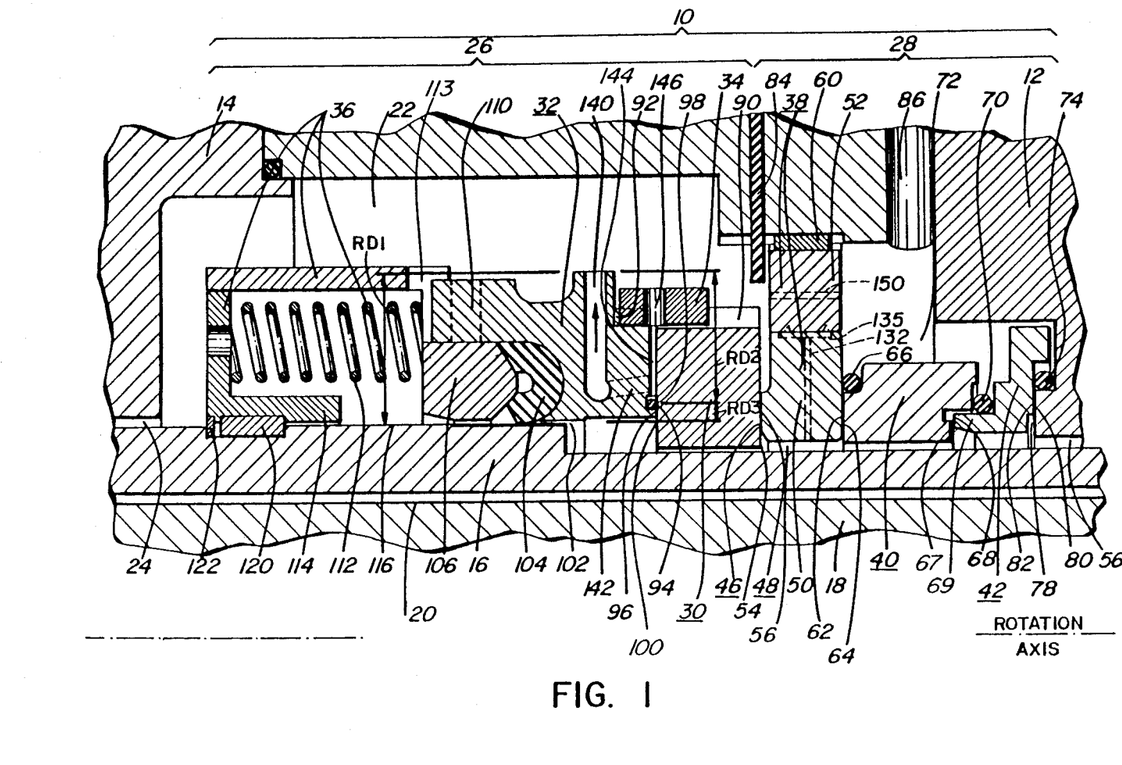
FIG. 1 is a longitudinal half section illustrating one embodiment of the invention.

The stationary assembly 28 includes a composite seal ring 38 which engages the rotary seal ring 30 in face-to-face sealing proximity. The composite seal ring 38 is engaged by a stationary support ring 40 which, in turn, is engaged by an isolation ring 42 which acts between the housing extension 12 and the aforementioned support ring 40. The isolation ring is merely an adaptor to provide the desired form of engagement for the support ring no matter what the given form of the stationary housing extension. All of these components, the structures associated therewith and the manner in which they perform, will be more fully described hereafter. It will also be noted that the embodiment of FIG. 1 shows a design in which the rotary assembly is spring-mounted and axially movable while the stationary assembly includes a composite seal ring structure. By effecting relatively minor design adaptions, the following alternative arrangements can also be provided wherein:

(1) The rotary assembly is spring mounted and axially movable and includes the composite ring;

(2) The stationary assembly is spring mounted and axially movable and contains the composite ring;

(3) The stationary assembly is spring mounted and axially movable and the rotary assembly contains the composite ring.

Returning again to the drawings, the rotary seal ring 30 and the composite seal ring 38 define relatively sliding, annular, radially directed seal faces 48 and 46 respectively. These seal faces are highly finished by lapping to within a few lightbands of the desired degree of flatness thereby to achieve the sealing action of the seal assembly. The composite seal ring 38 comprises an interlocked pair of annular rings with the radially innermost ring 50 having said annular seal face 46 thereon and being of a relatively weak material such as carbon graphite. The radially outermost ring 52 is termed a shrink ring and this ring is of a relatively strong material, such as steel or other metal, and it embraces the innermost ring 50 in shrink-fitted or other interlocked relation thereto whereby pressure forces tending to expand or contract the composite ring are substantially absorbed by the outermost ring. The degree of interlocking between the carbon graphite ring 50 and the shrink ring 52 is determined such that the composite seal ring 38 will meet the functional requirements of a particular application. This aspect of the invention will be dealt with more fully hereinafter.

With further reference to the composite seal ring 38, the annular seal face 46 is located on a protruding annular flange-like section of the carbon graphite ring 50 so that the slow wear of the carbon graphite material over long operating periods can be accommodated without losing sealing effectiveness until the protrusion wears almost away and the seal thereby wears out. A measure of sealing effectiveness is the stability of leakage and the rate of leakage of the seal assembly, whereas wear rate is related to be incidence and severity of rubbing contact between the seal faces 46 and 48. Rubbing contact will be avoided only if the seal faces 46 and 48 are separated by a narrow uniform or flow-direction converging gap 54. At the same time, the gap must be narrow enough that leakage remains acceptably low. A flow-direction diverging gap 54 will result in rubbing contact and wear of the seal rings 30 and 38 at their respective seal faces 48 and 46. All the remaining seal assembly components play roles of differing significance in maintaining this uniform gap 54 or a slightly flow-direction converging gap 54. In the embodiment shown in FIG. 1, the direction of flow of the confined pressurized medium is from the high pressure chamber 22 previously noted to the annular space 56 between the rotary and stationary assemblies 26, 28, and the shaft sleeve 16. An arrangement enabling the amount of leakage to be utilized to provide a clearly measurable indication of seal wear will be described hereinafter.

The composite seal ring 38 has an anti-rotation lug 60 on its outer peripheral surface to engage with a slot formed in the removable extension 12 of the stationary housing 14, which lug serves to fix the entire stationary assembly 28 against rotation. The previously noted stationary support ring 40 is carefully machined and lapped to provide a support face 62 which is finished to within a few lightbands of flatness thereby to provide strengthening support for the structurally weaker carbon graphite ring 50 of the composite seal ring 38. Face 62 makes contact with the rear face 64 of the carbon graphite ring 50, such surface 64 being itself finished to within a few lightbands of flatness. The composite seal ring 38 and its stationary support ring 40 collectively achieve precise control of the deflection of seal face 46 under all operating and service conditions. A flexible static O-ring seal 66 prevents any access of the confined pressurized fluid to the interface defined between the highly finished support surfaces 62 and 64. This O-ring seal gives additional insurance against leakage radially inward between the surfaces 62 and 64.

By virtue of the influence of the pressure of the confined fluid medium, the stationary housing 14 and the removable housing extension 12 will tend to deform. To alleviate the disruptive influence of the housing deformation on the function of the composite ring 38 and its stationary support ring 40 in controlling deflection of the seal face 46, the aforementioned isolation ring 42 is located between the housing extension 12 and the support ring 40. The isolation ring 42 is carefully machined to provide the desired form of engagement and to interact with the stationary support ring 40 under the influence of the fluid pressure in a manner to cause negligible impact on the deflection of the seal face 46 under various operating and service conditions as, for example, may result from changes in fluid pressure and temperature.

The isolation ring 42 and the stationary support ring 40 interact at the respective annular surfaces 67 and 68. A flexible O-ring seal 70 serves to seal the gap between the isolation ring 42 and the stationary support ring 40 from the confined pressurized medium in the annular space 72 which surrounds the stationary assembly 28, such space 72 being in effect an extension of chamber 22. Another flexible O-ring seal 74 prevents flow of the pressurized medium to the low pressure annular space 56 by way of the interface 78 between isolation ring 42 and the housing extension 12. This O-ring seal gives additional integrity against leakage radially inwards between the flat faces 80 and 82 of the isolation ring 42 and the removable housing 12, respectively.

The entire stationary assembly 28 is held in axial position during the assembly procedure by means of a suitable retainer 84 positioned in a recess in the housing extension 12 in close juxtaposition to the radially outer face portion of the composite seal ring 38.

It will be noted that a relatively large surface area of the stationary assembly 28 is exposed to the pressurized confined medium in the annular chamber 72. This serves in itself to enhance equalization of component temperatures. Channels. 150, to be hereinafter described, located in spaced apart relation around the outer perimeter of the composite seal ring 38, provide for the passage of high pressure fluid from chamber 22 into the annular chamber 72. In order to enhance and control this flow, a bleed-off passage 86 leading outwardly from annular chamber 72 is provided The turbulence in annular chamber 72 resulting from forced flow of the pressurized medium from chamber 22 to the annular chamber 72 by way of the above-noted channels around the outer perimeter of the composite seal ring 38 further enhances the convective heat transfer, thus tending to equalize the temperature distribution throughout the stationary assembly components and to make it axisymmetric. Temperature equalization or reduction of thermal gradients will be described in further detail hereinafter.

The rotary assembly 26 will now be described in further detail. The rotary assembly 26 includes the previously noted rotary seal ring 30 of relatively rigid low-wear material dissimilar to the carbon graphite ring 50 of the composite seal ring 38. The seal ring 30 is provided on its outer perimeter with circumferentially spaced apart slots 90 which engage rotatably only with cooperating lugs formed on the previously noted annular drive ring 34 which, in turn, engages rotatably only with conforming circumferentially spaced slots 92 formed on the annular rotary support ring 32. The rotary seal ring 30 and the rotary support ring 32 interact statically by way of the respective annular surfaces 94 and 96. The configuration of the rotary support ring 32, particularly including the radial location of the protruding annular contact surface 94, is determined in such a way that control of the deflection of the seal face 48 of the rotary seal ring 30 is achieved, and, in turn, control of the sealing gap 54 between the seal ring surfaces 46 and 48 is maintained over the range of operating and service conditions likely to be encountered.

A flexible O-ring seal 98 prevents the confined pressurized medium from chamber 22 from entering the relatively low pressure annular space 56 by way of the interface gap 100 between the rotary seal ring 30 and the rotary support ring 32, such interface gap being defined by the previously noted annular surfaces 94 and 96. This O-ring seal gives additional integrity against leakage radially inwards between the flat faces 94 and 96. Both of these surfaces 94 and 96 are precisely finished to within a few lightbands of flatness.

Because operating and service conditions can result in relative axial as well as rotary motion of the shaft sleeve 16 and the housing portions 14 and 12, the rotary support ring 32 is axially movable relative to the shaft sleeve 16 thus requiring an annular gap 102 between the rotary support ring 32 and the shaft sleeve 16. A flexible, slidable U-cup seal 104, otherwise known as the axial seal, prevents flow of pressurized fluid from the chamber 22 to the low pressure annulus 56 by way of the annular gap 102.

Intimate contact between the rotary support ring 32 and the flexible axial seal 104, and slidable contact between seal 104 and the shaft sleeve 16 is maintained by a follower ring 106 which is located within an annular recess in the rotary support ring 32 along with the flexible axial seal 104. The frontal face of the follower ring 106 is of a shallow V configuration and when it is forced into the secondary seal 104, the latter tends to be expanded thus causing it to make even tighter fluid sealing engagement between the rotary support ring 32 and the shaft sleeve 16.

The rotary support ring 32 also interacts with the previously noted spring assembly 36 by way of circumferentially spaced apart drive lugs 110 located on the end of rotary support ring 32, which lugs project in the axial direction thereby to mesh with corresponding notches 113 formed in the axially movable follower 106 of the spring assembly 36 thus fixing rotatably, but not axially, the rotary support ring 32 and the follower 106. The axially slidable follower 106 is forced axially toward the rotary support ring 32 by means of a plurality of circumferentially spaced coil compression springs 112 which are held in place by the annular spring holder 114. The axial force exerted by springs 112 is transmitted to the flexible axial seal ring 104 thus ensuring the integrity of the axial sealing action between this axial seal, the outer surface 116 of the rotary shaft sleeve 16 and the rotary support ring 32. The spring holder 114 is rotatably and axially fixed to the shaft sleeve 16 by way of a key 120 and the split ring 122, respectively, thus ensuring the conforming motion of the several parts making up the rotary assembly 26.

As with the stationary assembly, a maximum of the rotary assembly component surface area is exposed to the pressurized medium in the high pressure chamber 22 thereby to enhance equalization of component temperatures. As will be described more clearly hereinafter, the rotary support ring 32 is provided with channel means or fluid passages so arranged and connected as to cause a flow of the pressurized medium between a substantial portion of the rotary support ring 32 and the rotary seal ring 30 thus tending to equalize the temperature distribution throughout the rotating assembly components and to make it axisymmetric. These features will be described in further detail hereinafter.

Various advantageous features of the invention have already been briefly described. The following is a more complete description of certain important facets of the invention.

COMPOSITE SEAL RING - INTERFACE DEPRESSURIZATION

Figure 3:
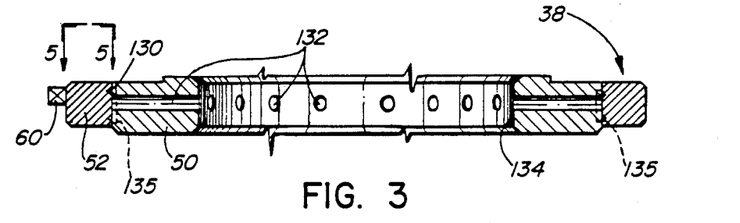
FIG. 3 is a cross-section view of the composite seal ring.

The composite seal ring 38 has been briefly described previously. It includes an outer shrink ring 52 which circumscribes a carbon graphite ring 50 in an interference relation. (Alternatively these may be bonded, taper-fitted, or otherwise interlocked together.) The optimum interference fit will vary widely depending on the exact application.

The rings 52 and 50 engage each other along an annular interface 130 with a radial contact stress at this interface proportional to the amount of interference. Under the influence of high fluid pressure acting where the interface meets the surface of the composite seal ring 38, this fluid pressure can penetrate the interface and would relieve the radial contact stress, possibly to a condition of looseness between the shrink ring 52 and carbon ring 50. To overcome this problem, provision is made to drain off fluid pressure at the interface 130 to the low pressure side so that no fluid pressure applies around at the major portion of the interface. To accomplish this, the carbon ring 50 is provided with circumferentially spaced, radially arranged passages 132 leading from interface 130 to the inner bore 134 of ring 50, which is exposed to the low pressure annular chamber 56. Interconnecting shallow circumferential and axially disposed grooves 135 around and along the interface 130 and formed in one or both of rings 50 and 52 and communicating with the passages 132 ensure the major portion of the interface is drained. The drainage path to the low pressure zone from the interface must be sized to present substantially less resistance to flow than the seepage path into the interface from the high pressure zone.

SEAL LEAKAGE USED TO INDICATE SEAL WEAR

It was noted previously that provision is made for the amount of seal leakage to change in such a way as to provide a measurable indication of seal wear. This is accomplished here by control of the seal balance. Seal balance involves several factors including the differential fluid pressure across the seal and the axial loadings.

Figure 4A:
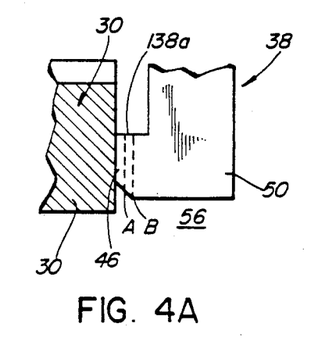
FIG. 4A, 4B and 4C are fragmentary section views of the seal rings at the protruding seal face illustrating means providing for controlled leakage as the seal face wears down.
Figure 4B:
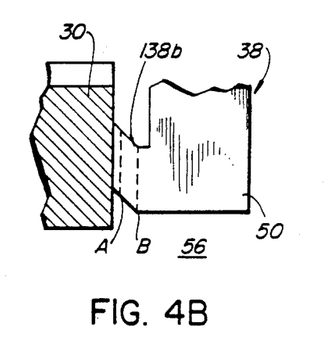
Figure 4C:
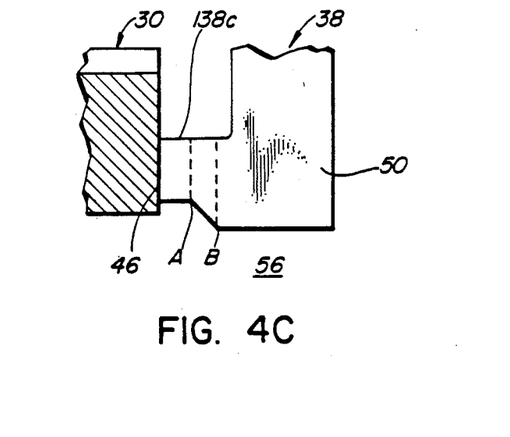

In accordance with this feature of the invention provision is made for the seal balance to be affected by changing the mean diameter of the annular sealing interface between the seal rings 30 and 38 in a controlled fashion such that after a selected amount of wear, the leakage reaches a value as to indicate the need for seal replacement. With reference to FIGS. 4A, 4B and 4C, there are shown portions of the rotary seal ring 30 and the fixed composite seal ring 38. In each of these embodiments, the carbon ring 50 (the ring subject to most of the wear), is provided with a protruding annular flange 138 directed toward the seal ring 30 and defining on its axially outer extremity the seal face 46 which mates with the seal face 48 on ring 30 to define an annular sealing interface therebetween. As the protruding flange 138 wears down, it becomes shorter in the axial direction and, because of the inclined flange shapes and surfaces shown, the mean diameter (one half the sum of the inside and outside diameters) of the seal face 46 thereon becomes smaller, i.e. it moves radially further into the low pressure zone 56 thus changing the seal balance and allowing the rate of leakage to increase.

In the embodiments of FIGS. 4A and 4B, the rate of leakage increases gradually with increasing wear up to dashed line B, while in the FIG. 4C embodiment, leakage remains fairly constant up to line A, thereafter increasing gradually up to line B. In each case, when seal face wear has reached line B, it is expected that the leakage level will have reached a rate indicating that seal replacement is required.

REDUCTION OF THERMAL GRADIENTS

Figure 2:
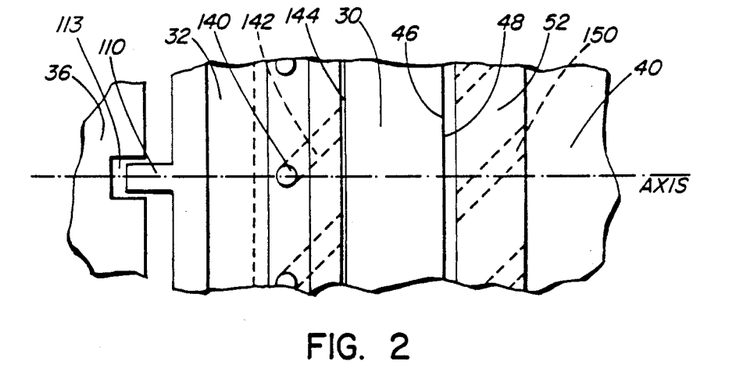
FIG. 2 is a radial view of a portion of the seal assembly illustrating the cooling channels etc. formed in portions of the rotary and stationary assemblies.

Reference was made previously to the provision of channels etc. in certain of the seal components through which fluid from one or other of the zones was induced to flow thereby to promote equalization and axisymmetry of temperature throughout the structure and to reduce distortions etc. Referring again to the drawings, the rotary support ring 32 is provided with a series of circumferentially spaced and radially oriented passages 140 extending from the radially inner part of the rotary support ring 32 and opening outwardly into the high pressure chamber 22. Each passage 140 communicates at its inner end with a respective short passage 142 (extending at an oblique angle to the axial direction) which opens into the radially extending radial gap 144 located between adjacent end faces of rotary seal ring 30 and the rotary support ring 32. Radial gap 144 extends from the axially inwardly disposed O-ring seal 98 between the seal ring 30 and rotary support ring 32 to the outer perimeters of same. The drive ring 34 which extends between the above rings is provided with a closely spaced series of axially arranged passages 146 which permit free flow of fluid from high pressure zone 22 into the radial gap 144. It will also be noted that passages 140 are of greater radial extent than the combined axial extent of radial gap 144 and passages 146. Hence, as the whole assembly 26 rotates during use, the unbalanced centrifugal forces acting on the fluid contained in passages 140, 142, 146 and radial gap 144 cause the fluid to enter the passages 146 and to move inwardly through the radial gap 144, thence turning around and moving along through passages 142 and thence outwardly through passages 140. This fluid movement tends to reduce thermal gradients in the parts with which it comes in contact, thus reducing thermal stresses and deflections. The fluid flow across the adjacent end faces of the rotary support ring 32 and rotary seal ring 30 is particularly beneficial in reducing thermal stresses and deflections which might otherwise impair the integrity of the fluid seal formed between the highly finished seal faces 46 and 48. This fluid flow in radial gap 144 is given a circumferential component of motion relative to the adjacent end faces of support ring 32 and rotary seal ring 30 to enhance the axisymmetry of the cooling by locating the passages 142 so that they are at an oblique angle to the axial direction (as best seen in FIG. 2). There is therefore inward swirling flow through the radial gap 144 and highly effective cooling of the adjacent end faces of rings 30 and 32.

Figure 5:
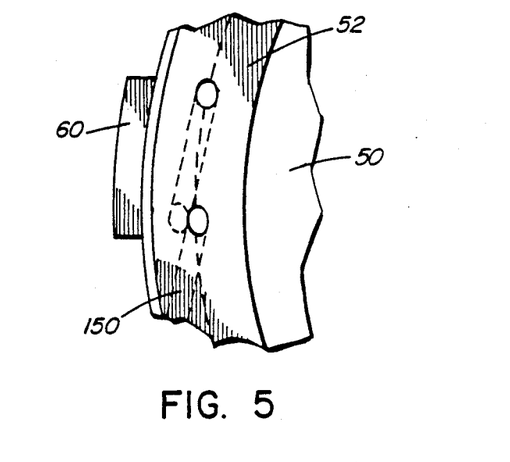
FIG. 5 is a fragmentary view of the peripheral portion of the composite seal ring.

Provision is also made for reducing thermal gradients in the stationary assembly 28 and promoting their axisymmetry. With reference to FIGS. 2 and 5, the shrink ring 52 of composite seal ring 38 is provided with a series of circumferentially spaced small fluid passages 150 which extend through from one side of the ring to the other, the passages 150 being oblique to the axial direction by about 45 degrees. Passages 150 allow for movement of the high pressure fluid from chamber 22 into the annular chamber 72 surrounding the stationary assembly 28, provided that such fluid is allowed to escape from chamber 72 through the previously noted bleed-off port 86. The oblique inclination of passages 150 imparts a swirling action to the fluid in chamber 72, which fluid is in contact with major surface areas of the seal ring 38, stationary support ring 40 and the isolation ring 42 thus promoting uniformity and axisymmetry of temperature and greatly reducing thermal distortion problems.

AXIAL LOADINGS - HYDRAULIC PRESSURES

The seal construction described provides a substantial degree of hydraulic balancing such that the contact forces on the rotary seal ring 30 are minimized. The axial contact force at the interface 96 where the rotary seal ring 30 rests against the rotary support ring 32 is a small proportion of the hydraulic loads imposed on the rotary seal ring 30 by typical pressure differentials between the high pressure zones 22 and 72 and the low pressure zone 56. With reference to FIG. 1 the hydraulic loading area (exposed to pressure chamber 22) on the left hand end of rotary support ring 32 is approximately proportional to the axial dimension RD1 between the axial seal interface 102 at the shaft sleeve 16 surface and the outermost periphery of the rotary support ring 32. The hydraulic loading area on the opposite end of rotary support ring 32 exposed to this same high pressure zone is approximately proportional to axial dimension RD2, coupled with any small component of hydraulic loading arising from any pressure in the low pressure chamber 56 acting on an area proportional to the small dimension RD3. As shown, since RD1 is only slightly larger than RD2, and since the hydraulic loading arising from the low pressure chamber is usually small or non-existent, only a relatively small proportion of the total axial hydraulic loading remains as axial contact force transmitted through the interface surfaces 94, 96 between the rotary support ring 32 and the rotary seal ring 30. Because this axial contact force is reduced to a low value by enabling RD3 to be small, the associated radial friction shear force acting on interface 96 of the rotary seal ring 30 will be small and will therefore not vary sufficiently with pressure temperature variations in the seal environment to cause substantial rotary seal face deflection hysteresis. The seal face 48 of rotary seal ring 30 will therefore distort in a more controlled and predictable manner in response to varying operating condition than would otherwise be the case thus enabling improved and more stable seal performance.

When considering effectiveness of hydraulic isolation of the stationary support ring 40 from the isolation ring, the oppositely directed hydraulic load creating fluid pressure in chamber 72 acting on the end of the stationary support ring 40 remote from composite seal ring 38 counteracts a portion of the oppositely directed hydraulic load from this same pressure acting on the support ring 32. Because of the similar radial locations of the spigot 69 on isolation ring 42 against O-ring 70 seals and the interface 102 of the axial seal at the shaft sleeve to surface, the overall effect of the structure shown is such that hydraulic balance is almost achieved between the interface surfaces 67 and 68. Axial contact force is therefore reduced to axial force exerted by the biasing springs and any slight additional force due to hydraulic imbalance. Hence the axial contact force transmitted through the interface surfaces 66 and 68 between the isolation ring 42 and the stationary support ring 40 is reduced to a relatively small proportion of the total axial hydraulic loading. Because of this reduction, the associated radial frictional shear force acting on interface 68 of the stationary support ring 40 will be small, thus giving similar advantages at the stationary seal face 46 as already described hereinbefore for the rotary seal face.

Returning again to the rotary support ring 32, the radial dimensions RD1 and RD2 are dependent on the relation between the diameter of the axial seal interface 102 at the surface of the rotary shaft sleeve 16 and the diameter of the O-ring seal 98 between rotary support ring 32 and rotary seal ring 30. If they are made equal, the hydraulic loadings will balance one another and, if this same O-ring seal has a smaller diameter, the net hydraulic loading will tend to cause separation between the interface surfaces 94, 96 and cause leakage.

In general, in embodiments similar to that shown in FIG. 1, where the leakage between the seal faces is radially inwards from a high pressure zone at the outside to lower pressure at the inside of the seal rings, the diameter of the axial seal interface 102 at the surface of the rotary shaft 16 should be slightly smaller than the diameters of the surfaces against which O-rings 98 and 70 seal, thereby to provide at least some slight axial contact force and prevent separation at interfaces 94, 96 and 67, 68 respectively, whatever the pressure of the contained fluid.

In an alternative arrangement (not shown) where the pressure zones are reversed from that shown in FIG. 1, the diameter relationship described above is also reversed whereby a substantial hydraulic balance is achieved while a slight degree of hydraulic imbalance may be used to assist the biasing springs in order to ensure that no separation occurs at a relevant support ring interface due to extraneous factors such as already noted.

Several preferred embodiments of the invention have been described above by way of example. Those skilled in this art will realize that numerous changes may be made to the details of the construction disclosed without departing from the spirit or scope of the invention as hereinafter claimed.

We claim:
1. A rotary end face seal comprising:
    (a) a pair of sealing members in relatively rotatable sealing proximity,
    (b) each of said members defining a generally radially arranged annular sealing surface, said annular sealing surfaces being in face-to-face sealing proximity with one another during use to separate a zone of higher fluid pressure from a zone of lower fluid pressure while allowing relative rotation between said sealing surfaces, (c) one of said sealing members comprising a composite ring including a pair of annular rings which are interlocked together, with one of said rings being of a relatively weak and/or deformable material and having said sealing surface thereon while the other of said rings is of a relatively strong material and is arranged to contact and structurally support the relatively weak and/or deformable ring along a region of contact, with an annular interface being defined by the region of contact between said annular rings, which interface is located such that any fluid seeping into the interface from said zone of higher fluid pressure tends to loosen the interlocked relation between said rings and/or to create stress and deformation of the weaker and/or more deformable ring, and wherein the improvement comprises:

(d) passage means associated with said interface to reduce the action of any such fluid seeping into the interface from the zone of higher fluid pressure and to allow for the presence of a relatively higher pressure differential between said zones while at the same time providing for lower stress or deflection of the weaker and/or more deformable ring and/or a reduced tendency for the interlocked relation thereof with the stronger ring to be loosened;

(e) said passage means including a plurality of interconnecting grooves extending within said interface and formed in at least one of said annular rings and which grooves communicate with passages extending from the interface to the zone of lower pressure to drain off any fluid pressure acting within said interface, the passage means within and away from said interface to the zone of lower fluid pressure presenting substantially less resistance to fluid flow than is encountered by any fluid seeping into said interface from the zone of higher fluid pressure.

2. The end face seal of claim 1 wherein said annular rings are in concentric relation with one another with the stronger ring surrounding the inner weaker and/or more deformable ring in shrink fitted relation thereto to interlock the two rings together, said passages extending from said interface to the zone of lower fluid pressure being defined in said inner ring.

3. The end face seal of claim 2 wherein the outer ring is of metal and the inner ring is of a carbon material.

4. The end face seal of claim 1 wherein the stronger ring is of metal and the weaker and/or more deformable ring is of a carbon material.

5. An annular sealing member for use in a rotary end face seal wherein a pair of annular sealing members are arranged in relatively rotatable sealing proximity with each of such members defining a generally radially arranged sealing surface, said sealing surfaces being in face-to-face relatively rotatable sealing proximity during use to separate a zone of lower fluid pressure from a zone of higher fluid pressure, said annular sealing member comprising:

a composite ring including a pair of annular rings which are interlocked together with one of said rings being of relatively weak and/or deformable material and having said sealing surface thereon while the other of said rings is of a relatively strong material and is arranged to contact and structurally support the relatively weaker and/or more deformable ring along a region of contact with an annular interface being defined by the region of contact between said annular rings, which interface is located such that any fluid seeping into the interface from said zone of higher fluid pressure tends to alter the interlocked relation between said rings and/or to create stress and deformation of the weaker and/or more deformable ring, and wherein the improvement comprises:

passage means associated with said interface to reduce the action of any such fluid seeping into the interface from the zone of higher pressure and to allow for the pressure of a relatively higher pressure differential between said zones while at the same time providing for lower stress or deflection of the weaker and/or more deformable ring and/or a reduced tendency for the interlocked relation thereof with the stronger ring to be altered;

said passage means including a plurality of interconnecting grooves extending within said interface and formed in at least one of said annular rings and which grooves communicate with passages extending from the interface to the zone of lower pressure to drain off any fluid pressure acting within said interface, the passage means within and away from said interface to the zone of lower fluid pressure presenting substantially less resistance to fluid flow than is encountered by fluid seeping into said interface from the zone of higher fluid pressure.

6. The annular sealing member of claim 5 wherein said rings are in concentric relation with one another with the stronger ring surrounding the weaker and/or more deformable ring in shrink fitted relation thereto to interlock the two rings together, said passages extending from said interface to the zone of lower fluid pressure being defined in said inner ring.

7. The annular sealing member of claim 6 wherein the stronger ring is of metal and the weaker and/or more deformable ring is of a carbon material.

8. A rotary end face seal comprising:

(a) an annular stator assembly having an annular seal face thereon;

(b) an annular rotor assembly having an annular seal face thereon adapted to rotate about a rotation axis, the annular seal faces of said stator assembly and said rotor assembly being in relatively rotatable face-to-face sealing proximity when in use to separate a high fluid pressure zone from a low fluid pressure zone while allowing relative rotation between said sealing surfaces about said rotation axis, said fluid pressure zones being subject to temperature differentials and/or temperature changes therebetween;

(c) passage means in at least one of said assemblies and exposed, during use, to fluid in one of said zones and adapted and arranged to provide for flow of fluid of said one zone through said passage means in response to a differential fluid pressure force created during use of said seal;

(d) said passage means being further adapted and arranged such that the flowing fluid therein and/or in regions adjacent to said passage means tends to equalize temperatures in said at least one assembly throughout a substantial part of the radial, circumferential and axial extent thereof thereby reducing thermal distortion of said at least one assembly; and wherein:

(e) said at least one assembly includes a seal ring having one of said annular seal faces thereon, and a support ring sealingly engaged with said seal ring, said passage means including a radial space between the seal ring and the support ring, and said passage means still further being adapted and arranged to create a flow of the fluid with a radial component of movement in said radial space over adjacent radial surfaces of the seal ring and the support ring thereby to assist in providing more equal temperatures throughout said at least one assembly.

9. The rotary end face seal of claim 8 wherein said at least one assembly is the rotor assembly, with said passage means including generally radially arranged portions such that the differential fluid pressures are generated by centrifugal forces acting on the fluid during rotation of the rotor, said support ring being a rotary support ring rotatable with the seal ring.

10. The rotary end face seal of claim 9 wherein said passage means includes generally radially arranged flow passages in said rotary support ring having inner ends communicating with radially inwardly disposed portions of said radial space via further flow passages arranged such that rotation of the rotary support ring causes outward movement of the fluid through the radially arranged flow passages as a result of centrifugal forces acting thereon and radially inward flow through said radial space having a circumferential component of motion relative to the rotating rings to provide a swirling flow in said radial space to assist in providing more equal and axisymmetric temperatures throughout said rotary assembly.

11. The rotary end face seal of claim 10 wherein said further flow passages are arranged obliquely to said rotation axis.

12. The rotary end face seal of claim 10 wherein said passage means includes additional flow passages associated with said stator assembly, and first ends of said additional flow passages communicating with one of the pressure zones wile the other ends of the additional flow passages communicate with a further zone which in turn communicates with a bleed off passage through which a controlled leakage occurs to promote flow through said additional flow passages, at least a substantial portion of said stator assembly being exposed to fluid in said further zone, said additional flow passages being arranged to create fluid motion in said further zone thus tending to equalize temperatures throughout said stator assembly.

13. The rotary end face seal of claim 12 wherein said stator assembly includes a stationary seal ring having one of said seal faces thereon and wherein said additional flow passages extend from one side of the stationary seal ring to the opposing side thereof in circumferentially spaced relation to each other and at an oblique angle to the axial direction so as to create a swirling action in the fluid in said further zone to assist in equalizing said temperatures.

14. The rotary end face seal of claim 13 wherein the stator assembly includes a rigid stationary support ring in said further zone in supporting contact with said stationary seal ring and exposed to the moving fluids in said further zone whereby the temperature of said stationary support ring is also stabilized.

15. The rotary end face seal of claim 8 wherein a substantial part of both said rotor assembly and said stator assembly are exposed to the fluid in one of said zones whereby, in use, both the rotor assembly and said stator assembly tend to approach a near uniform temperature.

16. A rotary end face seal comprising:

(a) an annular stator assembly having an annular seal face thereon;

(b) an annular rotor assembly having an annular seal face thereon adapted to rotate about a rotation axis, the annular seal faces of said stator assembly and said rotor assembly being in relatively rotatable face-to-face sealing proximity when in use to separate a high fluid pressure zone from a low fluid pressure zone while allowing relative rotation between said sealing surfaces about said rotation axis, said fluid pressure zones being subject to temperature differentials and/or temperature changes therebetween;

(c) passage means in at least one of said assemblies and exposed, during use, to fluid in one of said zones and adapted and arranged to provide for flow of fluid of said one zone through said passage means in response to a differential fluid pressure force created during use of said seal;

(d) said passage means being further adapted and arranged such that the flowing fluid therein and/or in regions adjacent to said passage means tends to equalize temperatures in said at least one assembly throughout a substantial part of the radial, circumferential and axial extent thereof thereby reducing thermal distortion of said at least one assembly; and wherein:

(e) said at least one assembly includes a seal ring having one of said seal faces thereon and a support ring sealingly engaged with said seal ring, said passage means including flow passages having first ends thereof communicating with one of the pressure zones while other ends of said flow passages communicate with a further zone which in turn communicates with a bleed-off passage through which a controlled leakage occurs to promote flow through said flow passages, said one assembly being exposed to the fluid in said further zone, said flow passages being arranged to create fluid motion in said further zone thus tending to equalize temperatures in said one assembly.

17. The rotary end face seal of claim 16 wherein said at least one assembly is the stator assembly, said stator assembly comprising said seal ring having said one of said seal faces thereon, said seal ring being stationarily, and wherein said flow passages extend from one side of the stationary seal ring to the other in circumferentially spaced relation and at an oblique angle to the axial direction so as to create a swirling action in the fluid in said further zone to assist in equalizing said temperature.

* * * * *